March 17, 1970  AKINOBU MATSUDA  3,500,699
VARIABLE RATIO STEERING GEAR

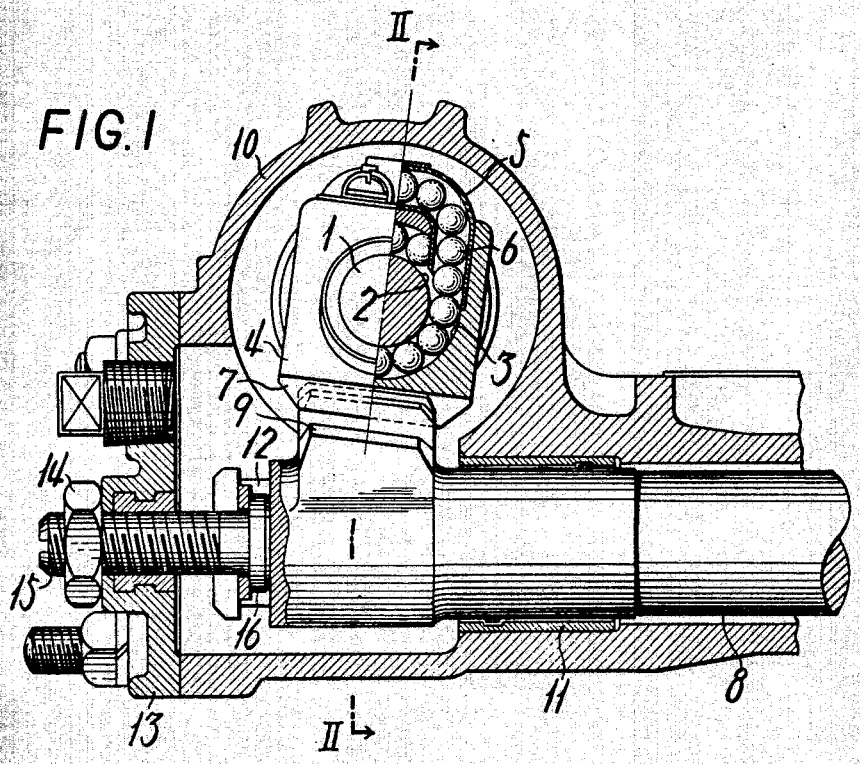

Filed March 12, 1968  3 Sheets-Sheet 3 radius angle
(turning angle)

Inventor
AKINOBU MATSUDA
By Mason, Fenwick & Lawrence
Attorneys

United States Patent Office 3,500,699
Patented Mar. 17, 1970

3,500,699
VARIABLE RATIO STEERING GEAR
Akinobu Matsuda, Osaka, Japan, assignor to Koyo Seiko Company, Limited, Osaka, Japan
Filed Mar. 12, 1968, Ser. No. 712,497
Claims priority, application Japan, Mar. 28, 1967, 42/19,719
Int. Cl. B62d 1/20; F16h 1/04
U.S. Cl. 74—498
3 Claims

ABSTRACT OF THE DISCLOSURE

This invention relates to improvements in a steering gear that transmits steering operation from a steering column to steering wheels in order to secure stability of driving required in accordance with an increase in the speed of automobiles, said improvements being made in a variable ratio steering gear which brings about stability in the operation of a steering handwheel during high speed and a smooth feel of the steering handwheel through a reduction in the driver's efforts required for turning the handwheel heavily during slow driving as for example in garaging.

---

This invention relates to improvements in a steering gear and particularly to improvements in a variable ratio steering gear in which a rack having teeth on a reference pitch line parallel to the axis of a steering shaft meshes with a sector having a tapered tooth gear of an improved special profile formed thereon and the gear ratio of the sector is successively changed in conjunction with the meshing between the two in proportion to the rotation of the sector from the neutral position toward either the right or the left side in accordance with the movement of said rack.

With an increase in the speed of automotive vehicles in recent times, the stability in the operation of a steering handwheel has come to be regarded as an important factor in the vehicle during high-speed driving on the one hand, while smoothness in the operation of the steering handwheel is considered necessary on the other hand when the handwheel has to be turned heavily as in garaging a vehicle.

The steering gear in conventional use is designed to be substantially large in its gear ratio. That is to say, generally steering resistance, for reasons of a steering linkage mechanism that transmits steering operation from a steering handwheel to steering wheels, tends to be stronger in proportion to an increase in the angle of rotation of the handwheel in the right or the left direction from the neutral position (straightforwardly advancing position of automobile), with the result that the driver is deprived of the smoothness in his operation of the steering handwheel. In order to overcome this disadvantage, it has been a general practice to increase the gear ratio. Such an increase in the gear ratio however is a factor that hampers a smooth feel in the operation of the handwheel in and adjacent the neutral position and is accompanied by the counterbalancing disadvantage that it causes roughness or irregularity in the operation of the handwheel during high-speed driving and impairs stability in steering. In contrast to this, a reduction in the gear ratio offers a disadvantage in its own way that it gives a rough and tight feel to the operation of the handwheel. Thus a satisfactory solution to this problem is difficult to find. The steering mechanism that is designed to change the gear ratio of a sector in proportion as the sector that meshes with a rack moves in the right or the left direction from the neutral position by the axial movement of the rack is known as a variable ratio steering gear, for example in the U.S. Patent No. 2,159,225 to Phelps. But the variable ratio steering gear disclosed in the Phelps patent is characterized by a special tooth profile both in track and sector and especially by their changed reference pitch line and pitch circle. Moreover, in this patent it is clearly shown that the tooth profile of the sector is a straight gear parallel to the axial direction of a rockshaft. That is to say, the steering gear is of such a construction that the pitch line of the rack is arcuate and the pitch circle of the sector meshing with the rack is also made up of two arcs greatly eccentric with respect to the rockshaft, said arcs being crossed in the neutral position of the sector. The construction of the kind described not only involves a great difficulty in the determination of the reference pitch line of the rack and the determination of the pitch circle of tooth profiles of the sector, but also has the great disadvantage that the sector cannot be used as a tapered tooth gear, since the tooth profile of the pitch circle is made up of two arcs. The fact that the sector cannot be constructed except as a straight gear parallel to the axial direction of the rockshaft makes it impossible to adjust a backlash except by changing the distance between the centers of a rack and a sector by moving either an assembly of a steering shaft and the rack or an assembly of the sector and the rockshaft in a radial direction in time of control of the backlash caused as by the wear of tooth face, and eventually makes a steering gear structure itself very complicated, increasing the difficulty in controlling the backlash. On the other hand, it is ideal and convenient to control the backlash in the state of a steering housing being left mounted on the automobile. But to make such control with the steering housing left mounted on the automobile is impossible in the above patent to Phelps.

A primary object of this invention is to provide a steering gear in which, when a rack setting a straight line parallel to the axis of a steering shaft as a reference pitch line and having teeth formed on the reference pitch line meshes with a sector having a tapered tooth gear of special profile and then the sector thus meshed is moved either in the right or the left direction from the neutral position, its gear ratio is successively changed in proportion to an increase in the angle of rotation of the sector.

Another object of this invention is to improve a free and smooth feel in the operation of a steering handwheel by preventing an increase in the angle of rotation of a sector that meshes with a rack from increasing the force necessary for operating the steering handwheel in such a construction in which the rack is shifted in the axial direction by the rotation of a steering shaft and the gear ratio of the sector is successively increased in proportion to an increase in the angle of rotation of the sector in the right or the left direction from the neutral position.

Another object of the invention is not only to produce a free and smooth feel in the operation of a steering handwheel but also to improve stability in the operation of the steering handwheel in time of high-speed driving by making a gear ratio in the neutral position in the above construction smaller than that used in conventional steering gears.

A further object of the invention is to make a sector brings its function into maximum play as a variable ratio steering gear by forming into a special tooth profile the teeth of the sector alone that meshes with a rack used in the conventional steering, namely a rack setting a straight line parallel to the axis of a steering shaft as a reference pitch line and having a reference tooth profile of equal pitch and pressure angle formed on the reference pitch line.

A still further object of the invention is to provide a variable ratio steering gear which makes it possible to control the backlash in meshing of a rack with a sector by moving a rockshaft having the sector formed integrally therewith in the axial direction thereof, said axial movement of the rockshaft being made very simply, for example by the operation of an adjust bolt in contact with one end face of the rockshaft and said control being easily made with a steering unit left mounted on the automobile.

Yet another object of the invention is to make it possible to improve a variable ratio steering gear without making drastic changes of the component parts of the steering gear in conventional use except for changing only the sector thereof for a sector having a special tooth profile and formed according to the invention, thereby to greatly improve a handle feel in the steering of the vehicle during high-speed driving.

The objects described above can be attained by improvements in the tooth profile of the sector according to the invention and also by the suitable improvement of the pressure angle of a rack. The characteristics of this invention will become apparent from the following description made with reference to an embodiment of the invention to be hereinafter described in the specification and shown in the accompanying drawings in which:

FIG. 1 is a view of the steering gear according to this invention, shown longitudinally sectionally in part, along the axis of a rockshaft;

FIG. 2 shows, longitudinally sectionally in part, a relation between a rack and a sector along the axis of the steering shaft with the housing of the shaft removed along the line of II—II of FIG. 1;

Figure 3:
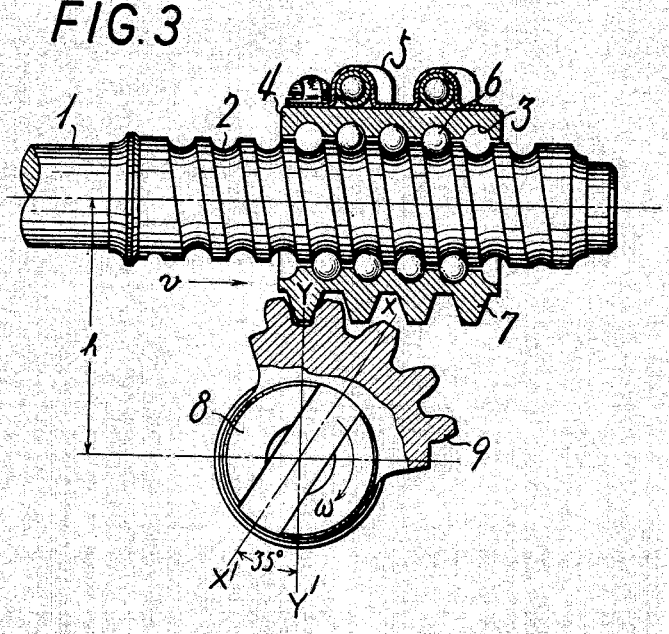
FIG. 3 is a view illustrative of the operation of the steering in which view the rack and the sector are shown shifted to the right from the position they took in FIG. 2.

A steering gear assembly of ball circulation type has been applied to automobiles of various types and its detailed structure is well known in the art and accordingly only a brief reference will be made to the structure and its related parts in the description to be made hereinafter. A steering shaft 1 operated by a steering handwheel is provided on the foremost end thereof with a helical groove 2. A nut 4 having an internal helical groove 3 is fitted over the helically grooved portion 2 of said steering shaft 1, and a multiplicity of balls 6 held by the nut 4 through a transfer tube 5 so as to be circulated are disposed between said helical groove 2 and said internal helical groove 3 so that the nut 4 may move in the axial direction of the steering shaft 1 in accordance with the revolution of the shaft 1.

The lower part of the nut 4 has a reference pitch line formed on the straight line parallel to the steering shaft 1 and a rack 7 having teeth formed on the reference pitch line. The teeth of said rack are shown in the form of a standard tooth form of equal pitch and equal pressure angle in the embodiment. The rack 7 as shown in FIG. 1 is sloped at a suitable angle with respect to the axial direction of a rockshaft 8 to be described hereinafter. This sloping is determined depending upon the angle of taper formed in a tapered shape with respect to the axial direction of the rockshaft of a sector 9 formed integrally with the rockshaft 8. Inside a housing 10 rotatably bearing the foremost end of said steering shaft 1 is held rotatably the rockshaft 8 disposed at a right angle with the steering shaft 1, and the sector 9 formed integrally with said rockshaft with the rack 7 of said construction having the standard tooth profile formed on the nut 4.

The base of the rockshaft 8 is carried rotatably by a bearing sleeve 11 shown provided in the housing 10 or other suitable means, and the foremost end not shown is carried on the housing 10 by the same means as the above, said foremost end being connected to a steering mechanism related with steering wheels (not shown). T-shaped groove 12 as shown in FIG. 1 is formed at the tail end of the rockshaft 8. The end flange 16 of an adjust bolt 15 to be threadedly fitted into the lid 13 of the housing 10 and to be locked a lock nut 4 is engaged with the groove 12 and the position of the rockshaft 8 is controlled in the axial direction by moving the adjust bolt 14 in the axial direction thereby to control the backlash in the meshing of the rack 7 with the sector 9.

As generally known, the turning force applied to a steering handwheel is antifrictionally changed into an axial movement of the nut 4 by a multiplicity of balls 6 interposed so as to be circulated between the helical groove 2 of the steering shaft 1 and the helical groove 3 of the nut 4, and the axial movement of the nut 4 in turn brings the rack 7 into meshing with the sector 9, and is changed into the rightward or leftward rotation in FIG. 2 of the rockshaft and transmitted from the rockshaft 8 through the steering mechanism to the steering wheels.

It is contemplated by the invention to introduce a variable ratio steering gear into the mechanism described above by forming the tooth profile of said sector 9 into a special profile. The important thing in determining the tooth profile of said sector 9 is that the distance $h$ (see FIG. 2) between the centers of the rack 7 and the sector 9 remains unchanged at any moment of the axial movement of the rack 7 and the rightward or the leftward rotation in FIG. 2 of the sector 9 meshing with the rack 7. Because the reference pitch line of the rack 7 is a straight line parallel to the axis of the steering shaft 1, and the center of rotation of the sector 9 is always positioned on the axis of the rockshaft 8. The meshing of the rack 7 with the sector 9 must be such that it is always carried out smoothly at any moment of change effected in the angle of rotation of the gear 9 in proportion to the axial movement of the rack 7. If the meshing should lack smoothness, the driver will have a very disagreeable feel of roughness or irregularity in the operation of a steering handwheel.

Under the restriction described above this invention is so constructed as to change successively the gear ratio between the rack 7 and the sector 9 in proportion to the change made in the angle of rotation of the sector 9 in accordance with the movement of the rack 7. As the operation of the invention is schematically shown in FIG. 3, when the distance $h$ (between the centers of the rack 7 and the sector 9) is held always definite and the rack 7 is moved at constant speed, the sector 9 increases in its angle of rotation to the right and left from the center position X–X', and in accordance with the increase in the angle of rotation, the sector 7 becomes lower in its angular velocity $\omega$.

Figure 4:
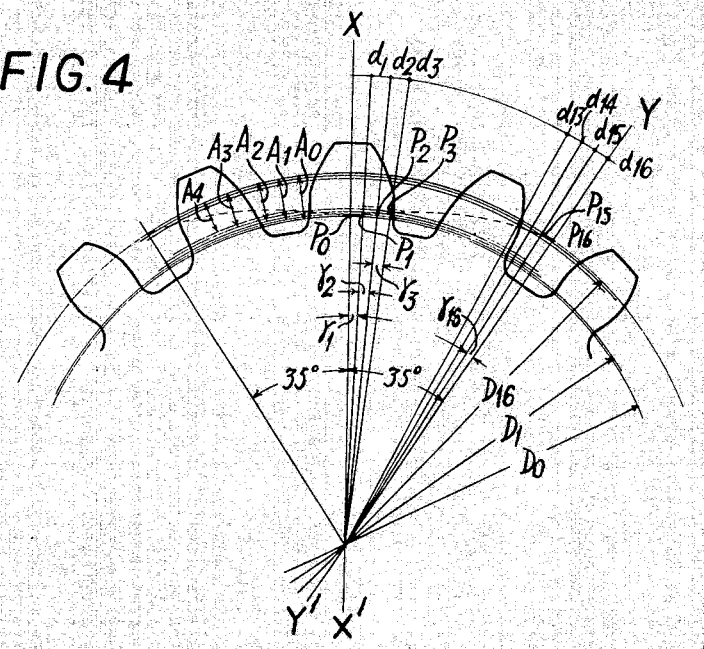
FIG. 4 is a diagram illustrative of an example that determines a special tooth profile of the sector according to the invention.

Generally, the gear ratio $i$ in the steering gear assembly of a ball circulation type is given by an expression:

$$i = \frac{\pi M Z}{L} \qquad (1)$$

wherein L represents the pitch of helical groove 2 and inner helical groove 3 that circulate balls 6 therein; M, a module; and Z represents the number of teeth of the sector 9 (in which the number of teeth means the number of teeth in the case where the sector is supposed not as a sector gear but as a completely circular gear). The teeth of the rack 7 are of equal pitch and pressure angle and formed on the reference pitch line made up of a straight line, and furthermore the distance $h$ between the centers of the rack 7 and the sector 9 is invariable, and accordingly when it is desired to change the gear ratio $i$ in the foregoing Expression 1, the number of teeth Z is used as a variable, since L and M are constants. And as described, steering resistance increases in proportion as the angle of rotation of a steering handwheel increases, and hence the steering resistance will be reduced by an increase in the gear ratio $i$ in proportion to an increase in the angle of rotation of the sector 9 in the right or the left direction from the neutral position of the sector 9 (position X–X' in FIG. 2). Accordingly, the tooth profiles on the circumference of the sector 9 are formed in the manner that the number of teeth Z may sucessively increase in proportion as a line of teeth shifts to the left or to the right from the line X–X' indicating the neutral position of the sector 9 in FIG. 2. That is to say, the tooth profiles of the sector 9 shown in FIGS. 2, 3 and 4 are formed such that the number of teeth Z is the smallest ($Z_{min}$) on the line X–X' and the largest ($Z_{max}$) on the line Y–Y' and that accordingly the number of teeth Z formed between the distance from the line X–X' to the line Y–Y' successively increases from $Z_{min}$ to $Z_{max}$ in proportion to the progress of division lines $d_1$, $d_2$, $d_3$ . . . $d_{16}$ in FIG. 4 covering the distance between the line X–X' and the line Y–Y' from $d_1$ to $d_{16}$.

This relation is numerically illustrated by way of example as follows:

If $Z_{min}$=14 teeth and $Z_{max}$=16.5 teeth, the number of teeth Z of the sector positioned in the aforementioned division lines $d_1$, $d_2$, . . . $d_{16}$ is designed in structure to increase successively in such a manner as $Zd_1$=14.15625 teeth, $Zd_2$=14.3125 teeth, . . . $Zd_{16}$=$Z_{max}$=16.5 teeth.

Thus the fact that the teeth formed in one sector 9 are designed to increase in number according as the teeth are shifted in position from the right to the left from the position X–X' naturally brings about a change in the pitch. But since the reference pitch line of the rack 7 is a straight line and the tooth profiles of the rack 7 are of equal pitch and equal pressure angle, it will be impossible for the rack 7 and the sector 9 to mesh with each other except in the neutral position on the line X–X', if the pitch of the sector 9 is changed simply in proportion to an increase in the number of teeth. And since the module M of the rack 7 is prevented from being changed, the module M of the sector 9 also must be made equal to the module M of the rack 7.

As described above, since the number of teeth Z of the sector 9 is $Z_{min}$ in the neutral position on the line X–X', increases successively up to $Z_{max}$ in proportion as the teeth are shifted in position either to the right or to the lift from the neutral position, and the change in the module M of the sector 9 is prevented, the sector 9 must be of the construction which makes it possible not only to increase the number of teeth Z but also to successively increase a pitch diameter P.C.D. that becomes a reference of forming tooth profiles and further to obtain the smooth meshing of the sector 9 with the rack 7 of the described construction.

The concept described above makes it possible to develop an ideal tooth profile that serves the aforementioned purposes by introducing a theory of profile shifted gears. That is to say, the pitch diameter P.C.D. is determined by an expression:

$$P.C.D.=Z\times M \quad (2)$$

wherein since M is a constant and Z is a variable, the pitch diameters that correspond to each of the aforesaid X–X', $d_1$, $d_2$, . . . $d_{16}$ (Y–Y') is the smallest in the position X–X' and the largest in the position Y–Y', increasing successively in the range from X–X' to Y–Y'. And an angle of shift that corresponds to a change in the P.C.D. is given by an expression:

$$\gamma = \frac{360° \times P}{Z \times R} \quad (3)$$

wherein P represents a pitch between the positions X–X' and Y–Y' of the sector and R represents a division ratio obtained by division of said pitch by division lines $d_1$, $d_2$, $d_3$, . . . $d_{16}$. That is to say, if connection is made of intersection points $P_0$, $P_1$, $P_2$, . . . $P_{16}$ of the pitch diameters $D_0$, $D_1$, $D_2$, . . . $D_{16}$, which is obtained by dividing suitably the distance between the positions X–X' and Y–Y' of the sector 9 and calculating the number of teeth, pitch diameters and angles of shift in the divided positions by use of the foregoing Expressions 1, 2, 3 with the division lines X–X', $d_1$, $d_2$, . . . $d_{16}$ determined by the angles of shift 0°, $\gamma_1$, $\gamma_2$, . . . $\gamma_{16}$ corresponding to said pitch diameters $D_0$, $D_1$, $D_2$, . . . $D_{16}$, a continued curve will be obtained in which curve the amount of shift at said interesection points becomes successively smaller in the order of $A_0$, $A_2$, . . . until finally the amount of shift at intersection point $P_{16}$ in the pitch diameter P.C.D. of $Z_{max}$ becomes zero as shown in FIG. 4. The coefficient of shift that can thus successively increase the gear ratio between the positions X–X' and Y–Y' is given by said curves $P_0$, $P_1$, $P_2$, . . . $P_{16}$ and the special tooth profile of the sector 9 can be determined by the change in the curve. The tooth profile determined by the theory described above is shown in the example in FIG. 4. The sector 9 shown in FIGS. 2, 3, and 4 indicates that the pitch of the sector which changes the gear ratio of the sector in its meshing with the rack 7 is 1.5 pitch both to the right and to the left from the position X–X' of sector 9, and the tooth profiles (tooth profiles at both right and left ends in the figures) positioned further leftward or rightward show the construction in which the gear ratio in the position Y–Y' is held constant. As the meshing of rack 7 with the sector 9 is illustrated by way of examples in FIGS. 2 and 3, the rack 7 and the sector 9 are brought into smooth meshing with each other at any position of the angle of rotation of the sector 9, and the gear ratio of the sector is shown greater in FIG. 3 than in FIG. 2.

An example of calculation to be made in the production of a sector will be shown below with reference to an embodiment of the invention. Suppose that the angle of rotation of the sector 9 in the area ranging from the neutral position X–X' of the sector 9 in which position a gear ratio falls to a minimum value to the position Y–Y' in which the gear ratio shows a maximum value is set at 35°, the pitch L of helical groove 2 is 8.466, modules M of rack and sector each are 3.5, a gear ratio $i_{min}$ in the position X–X' is 18.18, a gear ratio $i_{max}$ in the position Y–Y' is 21.4 and a gear ratio $i$ is successively increased from the position X–X' to the position Y–Y'. The number of teeth Z can be obtained from Expression 1 which follows:

$$Z_{min.} = \frac{18.18 \times 8.466}{\pi \times 3.5} = 14$$

$$Z_{max.} = \frac{21.4 \times 8.466}{\pi \times 3.5} = 16.5$$

$$\therefore Z_{max.} - Z_{min.} = 16.5 - 14 = 2.5$$

Then, if said difference in the number of teeth i.e. 2.5 are divided into 16 equal parts and the number of teeth were increased successively from the number of teeth $Z_{min}$ in the neutral position X–X' to the number of teeth $Z_{max}$ in the position Y–Y', the difference in the number of teeth on division lines X–X', $d_1$, $d_2$, . . . $d_{16}$ would amount to 2.5/16=0.15625, and pitch diameters $D_0$, $D_1$, $D_2$, . . . $D_{16}$ corresponding to the number of teeth on each division line would become through Expression 2

$D_1$=14.15625×3.5≑49.5468 mm.
$D_2$=14.3125×3.5≑50.0937 mm.
$D_0$=14×3.5=49 mm.
.
.
.
$D_{16}$=16.5×3.5=57.75 mm.

Furthermore, when the pitch P in the area ranging from the position X–X' to the position Y–Y' of the sector is 1.5, a division ratio R (the number of division between said X–X', $d_1$, $d_2$, . . . $d_{16}$) becomes 16, and hence the angles of shift corresponding to said pitch diameters can be obtained from Expression 3:

$$\gamma_1 = \frac{360° \times 1.5}{14.15625 \times 16} \doteq 2.4°$$

$$\vdots$$

$$\gamma_{16} = \frac{360° \times 1.5}{16.5 \times 16} \doteq 2.04°$$

Figure 5:
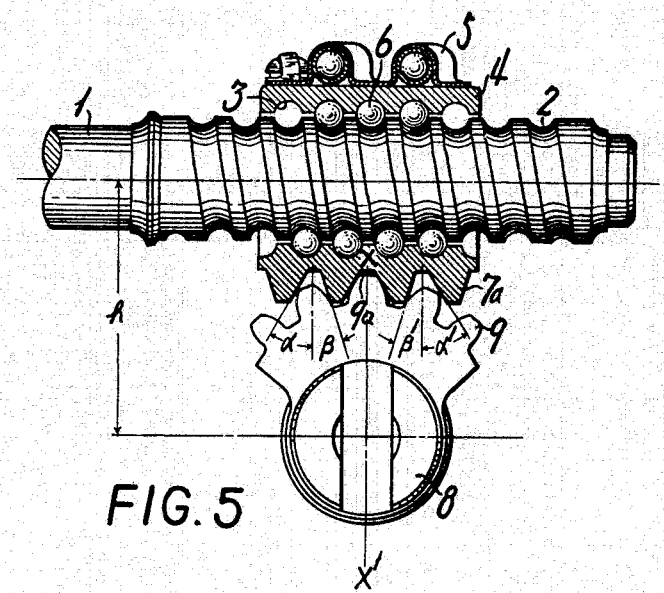
FIG. 5 is a view showing the state in which the rack meshes with the sector of the invention by improving the pressure angle of the rack.

FIG. 5 shows a modification of the tooth profile of this invention in which the pressure angles $\alpha$ and $\beta$ of the right flank and the left flank of the tooth profile of a rack 7a of equal pitch are widely changed symmetrically to the right and the left from the neutral position in which the rack 7a meshes with the sector 9. That is to say, the pressure angle $\alpha$ on the right flank of the tooth profile of the rack 7a on the left side of a center tooth 9a of the sector 9 in FIG. 5 is formed substantially twice as large as the pressure angle $\beta$ on the left flank and the pressure angle $\alpha'$ on the left flank of the tooth profile of the rack 7a on the right side of the center tooth 9a of the sector 9 is, symmetrically to the former, substantially as large as the pressure angle $\beta'$ on the right flank, and the pressure angles $\alpha$ and $\alpha'$ are constructed so as to be equal to each other and the pressure angle $\beta$ and $\beta'$ are constructed so as to equal each other. Accordingly, the tooth profiles of the rack 7a are constructed so as to be symmetrical on the right and the left sides from the center position X–X' indicative of the neutral position in which the rack 7a and the sector 9 mesh with each other. The dedendum of the center tooth 9a of the sector 9 can be increased in thickness and improved in strength by forming the tooth profiles of the rack 7a into the construction described above.

Figure 6:
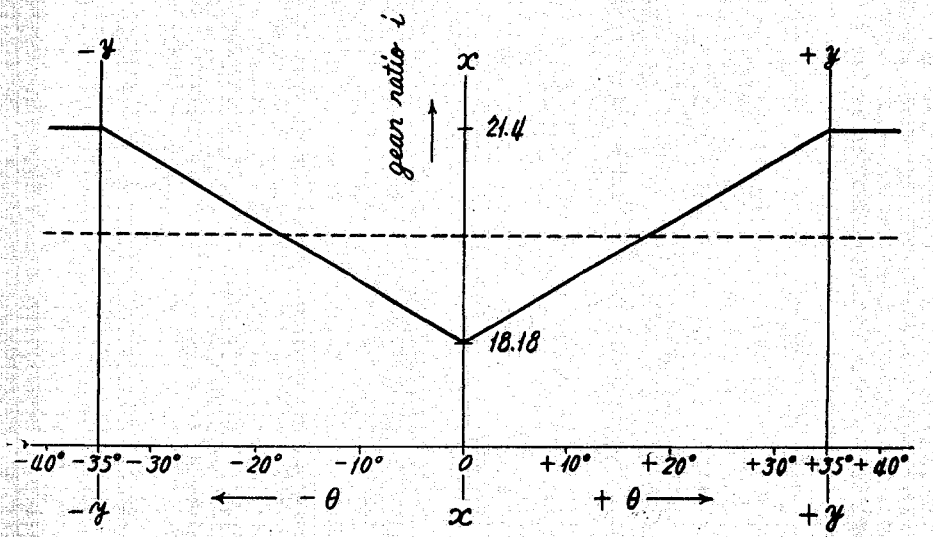
FIG. 6 is a diagram showing by comparison the working characteristics of the steering gear of the invention and the conventional steering gear.

If the gear ratio $i$ of the variable ratio steering gear is taken as an axis of ordinate and the angle of rotation $\theta(\theta=\gamma)$ as an axis of abscissa (in which a minus sign – and a plus sign + are added to the leftward rotation of the sector and the rightward rotation thereof, respectively), the gear ratio changes successively from the gear ratio 18.18 in the center position X–X' of the steering gear as shown in a solid line in FIG. 6 (which means a position in which the position X–X' of the sector intersects at a right angle with the axis of the steering shaft and the steering wheels properly faces toward the front) to the gear ratio 21.4 in the position $\pm Y - \pm Y'$ in which the sector is rotated through 35° to the right or the left.

The characteristics of the variable ratio steering mechanism of the invention will be apparent by comparison with the characteristics of the steering gear of a conventional type (shown in broken line).

It is to be understood that the characteristic curve shown in FIG. 6 is only one embodiment of the invention illustrative of the example of calculation described above, and the form of said characteristic curve can be freely changed by the modification of the details of the structure of the invention without departing from the scope and spirit of the invention.

As described, this invention provides a system which makes it possible not only to smoothly mesh the sector having teeth of special profile formed thereon with the rack having a straight line parallel to the axis of the steering shaft fixed as a reference pitch line and having the tooth profiles formed on said reference line, but also to increase successively the gear ratio of the steering gear in proportion as the angle of rotation of a steering handwheel increases from the neutral position and to form the sector into a tapered tooth gear, and accordingly the invention can greatly facilitate the control of backlash between the rack and the sector, attain improvements in stability and feel in the operation of the steering handwheel during high-speed driving, and serves to relieve the driver of his efforts required for turning the steering handwheel heavily.

What is claimed is:

1. In a steering gear of ball circulation type comprising a steering shaft having a helical groove at the foremost end thereof, a nut having an internal helical groove corresponding to said helical groove and fitting over the helical groove of said steering shaft so as to be movable in the axial direction thereof, a multiplicity of rollable bodies disposed between said helical groove and said internal helical groove so as to allow circulation by means of a transfer tube, a sector having tooth profiles meshable with a rack formed of a plurality of teeth having a linear pitch line and extending from one face of said nut, and a rockshaft formed integrally with said sector on the axis of rotation of the sector an improvement in such a variable ratio steering gear characterized in that the teeth of said sector have an outermost peripheral termination lying in a common circle and comprise a centrally positioned neutral tooth engageable with the center of said rack to define a neutral position with teeth on each side of said neutral tooth having surfaces and said neutral tooth having surfaces engageable with said rack providing a pitch diameter which progressively increases in accordance with angular displacement of said sector from said neutral position with said pitch diameter of said sector varying in concentric manner with respect to said neutral position to provide a uniform variation in the gear ratio between said rack and said sector for all positions on both sides of said neutral position wherein the change in pitch diameter is accompanied by a similar concentric variation in the number of teeth of said sector with respect to said neutral position so that the number of teeth of the sector are increased in proportion to angular displacement to the right or the left from the neutral position.

2. A variable ratio steering gear according to claim 1, wherein the rack has its tooth profiles formed in the standard tooth profile of equal pitch and equal pressure angle on a reference pitch line parallel to the axis of a steering shaft.

3. A variable ratio steering gear according to claim 1, wherein the pressure angles on the right and the left flanks of the rack teeth meshing with the sector are unequal in relation to a plane perpendicular to the pitch line of the rack sloped for purposes of increasing the thickness of the dedendum of the neutral tooth in the middle position of the sector.

References Cited

UNITED STATES PATENTS

| | | | |
|---|---|---|---|
| 2,953,932 | 9/1960 | Lincoln | 74—499 X |
| 2,964,967 | 12/1960 | Osborne | 74—498 |
| 3,064,491 | 11/1962 | Bishop | 74—498 X |
| 3,267,763 | 8/1966 | Merritt | 74—498 X |

MILTON KAUFMAN, Primary Examiner

U.S. Cl. X.R.

74—422